Patented Jan. 16, 1945

2,367,384

UNITED STATES PATENT OFFICE 2,367,384

METHOD OF REMOVING OIL FROM WATER

Sybren Tymstra, Berkeley, Calif., and Thomas K. Miles, Washington, D. C., assignors to Shell Development Company, San Francisco, Calif., a corporation of Delaware No Drawing. Application September 22, 1942, Serial No. 459,342

19 Claims. (Cl. 210—1)

This invention comprises a method for removing small quantities of water-immiscible organic oily impurities from water which may be dispersed as droplets or from an oily film. More particularly, it deals with contacting water containing small quantities of oily impurities with an inert solid coated with a cation surface active bonding agent, which agent has a preferential adhesion for the aggregate and oily impurities over that for the water, whereby the oil attaches itself to the bonding agent on the solid and is thereby easily removed from the water.

It is a purpose of this invention to remove economically, effectively and completely small quantities of organic oily impurities from water under such circumstances where the presence of the oily impurities in the water objectionably pollutes the water, or materially decreases the efficiency of the system in which it is used, or is a potential fire hazard, such as an oily film on the surface of water.

In general, the process of this invention comprises two main steps: first, contacting the water containing the small amount of oily impurities with the solid containing the cation surface active bonding agent, and then separating the resulting oily coated aggregate from the water. However, in certain applications of this invention it is important to include specific forms of two other steps in the process: namely, that of coating the inert solid with the bonding agent, and finally the step of regenerating the resulting oily coated solid after it has been contacted with the oily water. Before discussing the steps of the process in detail the properties of the essential ingredients involved therein will be discussed, such as the water and its oily impurities, the solid, and the bonding agent.

The water containing the organic oily impurities which are removed by the process of this invention may also contain inorganic impurities and salts which are not removed or affected by the process. This means that the process is selective for removing only organic oily compounds immiscible in water and solutions containing water, including the removal of oily films from fresh water, ocean water, brines and any aqueous solution.

The organic oily impurities removed by the process of this invention include all oils which are immiscible in water whether they are of mineral, vegetable and/or animal origin and usually are present in amounts of less than a fraction of a per cent. The most common oily impurities in water are mineral oils, particularly those that are lighter (i. e. lower boiling) than asphalts, such as gasoline, lubricating oils, fuel oils, etc. Other impurities may be fatty oils, fatty acids, alkyl phenols, petroleum nitrogen bases, mercaptans, essential oils, various naval stores, as turpentine, camphor, cedar oil, etc.

The solid employed as a support for the surface active bonding agents of this invention preferably consists of many small particles so as to have as large a surface area as possible. These solid particles must be substantially inert to water and to the impurities which may be contained therein and should preferably be of such a nature that they may be easily separated from water. The solids may comprise pulverized acidic, neutral, and/or basic mineral aggregates preferably of a particle size of less than about ¼ inch in diameter which includes a considerable quantity of fines to insure a large surface area for the adhesion of the bonding agent. Some such solids are beach sand, mud flat deposits, any water-washed silt or clay either in the wet or dry state, fine antioch sand, clays, crushed limestone, silica and glass dust, or fibers, various metal filings such as iron, brass, aluminum filings, etc., or even some organic fibrous materials as excelsior, rice hulls, chaff, packing straw, etc.

Surface active bonding agents are compounds which possess the property of materially increasing the adhesion of oils and aggregates toward each other when added in small amounts to one or both. Many such agents are both oil- and water-soluble, and the more potent ones increase this mutual adhesion to a point greater than the adhesion between the same aggregate and water. Some of the bonding agents are also quite heat stable up to about 300°–400° F., which in certain applications of this invention may be of considerable advantage. Cation-active bonding agents are usually most effective toward neutral and acidic solids, while anion-active agents are more effective toward basic solids. Mixtures of cation- and anion-active agents are effective toward basic solids. Mixtures of cation- and anion-active agents are effective on all solids, whether acidic, neutral or basic, or mixtures thereof.

Some cation surface active bonding agents are quaternary ammonium, phosphonium, arsonium or stibonium bases, or ternary sulfonium bases, or primary, secondary, or tertiary organic amines or salts thereof with various acids such as hydrochloric, sulfuric, phosphoric, sulfonic, formic, acetic, etc., acids all of whose bases or salts should preferably contain at least one long chain aliphatic radical of 8 or more carbon atoms; for example, dimethyl hydroxy ethyl dodecyl ammonium hydroxide, oleic ester of benzyl dimethyl hydroxy ethyl ammonium chloride, trimethyl stearyl ammonium bromide, trimethyl lauryl phosphonium chloride, diethyl oleyl sulfonium hydroxide, dimethyl benzyl lauryl ammonium chloride, dimethyl benzyl octadecyl ammonium chloride, methyl sulfuric acid salts of trimethyl octadecyl ammonium, oleic acid esters of hydroxy ethyl pyridinium chloride, dimethyl-palm kernel fatty amine or its hydrochlorosulfuric, tartaric, phosphoric or citric acid salts, the oleic acid esters of benzyl hydroxy ethyl morpholinium chloride or dimethyl hydroxy ethyl stearyl ammonium hydroxide, oleic acid esters of triethanol benzyl ammonium chloride; products of reaction of colophony and pyridine in the presence of ethylene oxide, chlorethyl glycol, chloracetic acid, and the like; or reaction products of trichloro-hardparaffin with dimethyl amine in the presence of benzyl chloride or dimethyl sulfate and also abietinyl amine, naphthylamine and tetrahydronaphthylamine. Other cation active compounds are primary, secondary or tertiary mono or polyamines or their alkylated, hydroxyalkylated or acylated derivatives, especially those containing 8 or more carbon atoms in the molecule, and many similar compounds, such as their chloro, hydroxy, ether, ester, sulfo, etc., derivatives and their salts; and analogous sulfur, phosphorus, arsenic and antimony derivatives. These also include paraffin wax amines, which wax amines comprise mixtures of aliphatic amines produced by chlorination of paraffin wax or hydrochlorination of long chain olefins (such as are obtained in the vapor reacting of paraffin wax) and ammonolysis of the chlorinated product. Still other suitable cation active compounds are the fatty acids and analogous amides and particularly the complexes formed by such amides and lower polycarboxylic acids such as oxalic, malonic, malic, etc., acids, for example: oxylate of stearamide, the malate of

Anion surface-active bonding agents are oleophilic organic acids of 10 or more carbon atoms or their salts. Those which have an aliphatic carbon chain of 10 or more carbon atoms are preferred. Some examples of such aliphatic acids are: higher polycarboxylic acids, especially alkylated dicarboxylic acids, such as alkyl succinic, alkyl sebacic, alkyl phthalic, etc., acids, higher saturated fatty acids of 10 or more carbon atoms, e. g., lauric, palmitic, stearic, etc., acids; wool fat acids; paraffin acids produced by oxidation of paraffin wax, and the like. Examples of other oleophilic organic acids which also may be used are: naphthenic acids, mahogany or green acids such as are formed in the treatment of lubricating oils with concentrated sulfuric, alkyl sulfonic or sulfate acids, Turkey red oil, etc. Suitable cations of the anion active agents are hydrogen, various metals, ammonia, organic amines, quaternary ammonium bases, etc. Of the metals, the polyvalent metals usually yield salts of greater activity, most of which, however, are water-insoluble, while the alkali metal salts are normally water-soluble but less active.

A preferred class of bonding agents are those which are soluble in water to at least a slight extent, so that they may be easily applied to the solid by deposition from aqueous solutions. It is often advantageous to react certain of these water-soluble reagents, such as some of the wax amines, with an equal molar quantity of halogen acid such as hydrochloric acid to increase their solubility in water and thereby increase the ease with which they can be applied to the solid. Among the preferred compounds are the paraffin wax amines and salts of strong mineral acids.

The four steps of the process will now be discussed in the order of operation.

1. *Coating the solid.*—The coating of the solid support with the bonding agent varies with the type of solid, bonding agent, and the circumstances under which the process of the invention is to be used.

If the bonding agent is water-soluble, it may be dissolved in water or else it may be colloidally dispersed, and the solution or dispersion may be contacted with the solid which may be water-wet or dry, in any suitable manner such as by mixing in a pug mill or in an agitated vessel, or by passing through a filter bed of the solid. When employing a muddy aggregate, the agent may merely be mixed with it. If a dry doped aggregate is desired, the resulting mixture may be dried in an oven or by other means, at a temperature below that of the decomposition of the agent. If the agent is water-insoluble it may be vaporized, for example with the aid of steam, and be condensed directly on the solid. Or else a suitable solvent may be employed, preferably one which is miscible with water, such as a lower alcohol, ketone, ester, ether, amine, etc., which may contain aliphatic, alicyclic and/or aromatic radicals. If the solvent is water-miscible, it is immaterial whether the aggregate is wet or dry, since the bonding agent has preferential adherence for the solid so that it will be deposited substantially quantitatively from the solvent in which it is dispersed. If, on the other hand, the solvent is water-insoluble, such as a relatively low-boiling liquid hydrocarbon, e. g., butane, pentane, hexane, benzene, toluene, naphtha, etc., the solid should preferably be substantially dry for efficient deposition of the agent. If the oily substance is used as solvent, it is necessary to remove it by steaming before the solid can be used for the purpose of this invention.

2. *Contacting the oily water.*—In this step organic oily impurities admixed with water are removed therefrom by attaching themselves to the cation active agent on the coated solid. This contact is necessarily carried out in the presence of water, and to be effective it must consist of a thorough contacting of the oily water with the coated solid, so that if possible all of the organic oily impurities dispersed in or on the water will have a chance to come in contact with the bonding agent on the solid. This contact may be effected in various manners, as by passing the oily water through a filter or bed of coated solid or by mechanically agitating the coated solid in a vessel with the oily water, or by passing a slurry of the solid and oily water through a section of pipe, or in the case of removing an oil film on the water, by sifting, throwing, blasting or ejecting a coated aggregate dry or as an aqueous slurry on the oil film on the water. The ejecting of the coated aggregate may be under sufficient pressure to cause emulsification of the aggregate and oil in the film which prevents any immediate vaporization of the oil that may not sink in the water, thereby reducing its potential fire hazard.

3. *Separating the resulting oil coated solid.*— The step of separation of the oil coated solid from the water is often automatic in that the solid is usually much denser than the water and readily settles out. However, a centrifuge, filter or other conventional mechanical separator may be employed. If an emulsion is formed part of it may not settle, particularly if the oily impurity is of comparatively low viscosity. In such a case separation may have to be effected by filtration, decantation or other mechanical means well known to those skilled in the art. In the case of removing an oil film from a body of water as in a river, lake or ocean the aggregate sinks the oil with it and will hold it at the bottom of the water, even if agitated, provided a sufficient concentration of agent is present on the aggregate to form a strong adhesive bond between the oil and the aggregate.

4. *Regenerating the oil coated solid.*—When the solid has absorbed as much oil as it can from the water it must be discarded or regenerated if continued efficient service is desired. The oil may be removed from the spent solid by steam vaporization, burning, solvent washing with a suitable oil solvent such as benzene or the like, or by the chemical action of an aqueous solution of an alkali metal hydroxide followed by neutralization with an aqueous acid. Some of these regeneration treatments may prove more practical than others for certain particular applications of the invention. As most regeneration treatments also remove the bonding agent from the solid together with the adsorbed oil the regenerated solid must usually be recoated as described in the coating step 1 above. The separated oil may be discarded, burned, or if desired, may be recovered.

Some of the many specific applications of the process of this invention include removing oil from sewage to prevent contamination of streams and killing of fish therein; or from condensates of steam engines wherein the cylinders and valves are lubricated by injecting oil into the steam as it enters the engine or pump since oil in the condensate returning to the boilers causes severe priming and foaming; or the sinking of oil slicks on water in harbors, which otherwise are potential fire hazards, or the recovery of valuable oils from steam condensates in various chemical industries as essential oils, naval stores, etc.

A practical method particularly applicable to the removal of oil from sewage or steam condensate comprises alternately passing the water through one of two parallel filter beds of bonding agent coated aggregate while regenerating the other.

In regard to the removal of oil films from a body of water a previously prepared and coated dry aggregate may be thrown on the oil film. A more economical procedure however is to employ clay and silt from the bottom of the harbor near the location of the oil film, thoroughly admix the silt slurry with the proper proportion of the bonding agent, and eject the mixture through a suitable jet onto the oil film on the water. Sufficient concentration of agent should be added to insure sinking as well as holding of the oil on the silt after it has been sunk. Emulsions, formed by violent turbulence from the ejected slurry, may remain afloat in part at least; however, fire hazard is nevertheless eliminated in that the oil is so bound to the aggregate and surrounded by water that it does not readily give off flammable vapors. Experiments have also shown that the ejection of such aqueous slurry on burning oil film on water is effective in extinguishing fires which have started beforehand.

The following comparative specific examples illustrate the effectiveness with which an oil film on water can be sunk:

Antioch sand was mixed with a solution of these various bonding agents shown below and carefully dried below 250° F., leaving the agent on the sand. A layer of gasoline was floated upon water in a 6 in. diameter jar and this coated sand was sprinkled upon the gasoline until all of the gasoline had been sunk. In the table that follows the weight of sand required to sink 1 gram of gasoline is reported.

| Bonding agent | Weight per cent bonding agent | Weight to sink 1 gm. gasoline | Holding properties |
| --- | --- | --- | --- |
| $C_{16}$-$C_{18}$ primary amine | .5 | 6.1 | Good. |
| Do | 1.0 | 5.6 | Do. |
| $C_{16}$-$C_{18}$ primary acetate | .5 | 6.6 | Do. |
| Paraffin *wax* amine | .5 | 5.1 | Do. |
| Malate of $C_{16+17}H_{31+35}\overset{O}{\overset{\|}{C}}$—NH—$CH_2CH_2NHCH_2CH_2OH$ | .5 | 5.8 | Do. |
| Do | .1 | 7.0 | Very poor. |
| Triton K-20 [1] | .5 | 4.8 | Good. |
| Do [1] | .1 | 5.6 | Do. |

[1] Cation surface active agent produced by Rohm & Haas believed to be a quaternary ammonium compound

We claim as our invention:

1. The process for selectively removing small immiscible amounts of organic oily impurities from water comprising contacting water containing said impurities with an inert solid having a relatively large surface and having deposited thereon a cation surface active bonding agent for said solid and impurities, and separating the water from said solid, said agent being selected from the group consisting of primary, secondary and tertiary organic amines and quaternary ammonium, phosphonium, arsonium, stibonium and ternary sulfonium organic compounds having at least one aliphatic radical of at least 8 carbon atoms.

2. The process of claim 1, wherein the amount of organic oily impurities is less than 1%.

3. The process of claim 1, wherein the organic oily impurities are mineral oils.

4. The process of claim 1, wherein the inert solid is a mineral aggregate consisting of particles not greater than ¼ inch in diameter.

5. The process of selectively removing small immiscible amounts of organic oily impurities from water comprising contacting said water containing said impurities with an inert solid having a relatively large surface and having deposited thereon a cation surface-active bonding agent for said solid and impurities, said agent being an amine having an aliphatic radical of at least 8 carbon atoms, and separating the water from said solid.

6. The process of selectively removing small immiscible amounts of organic oily impurities from water comprising contacting said water containing said impurities with an inert solid having a relatively large surface and having deposited thereon a cation surface-active bonding agent for said solid and impurities, said agent being a primary amine having an aliphatic radical of at least 8 carbon atoms.

7. The process of selectively removing small immiscible amounts of organic oily impurities from water comprising contacting said water containing said impurities with an inert solid having a relatively large surface and having deposited thereon a cation surface-active bonding agent for said solid and impurities, said agent being a paraffin wax amine.

8. The process of selectively removing small immiscible amounts of organic oily impurities from water comprising contacting said water containing said impurities with an inert solid having a relatively large surface and having deposited thereon a cation surface-active bonding agent for said solid and impurities, said agent being a quaternary ammonium compound having an aliphatic radical of at least 8 carbon atoms.

9. The process of selectively removing small immiscible amounts of organic oily impurities from water comprising contacting said water containing said impurities with an inert solid having a relatively large surface and having deposited thereon a cation surface-active bonding agent for said solid and impurities, said agent being an acid amide having an aliphatic radical of at least 8 carbon atoms.

10. The process of claim 1, wherein the amount of bonding agent deposited on the solid is less than 5% by weight of the solid.

11. The process of claim 1 wherein the amount of bonding agent deposited on said solid is between about $\frac{1}{10}$ and 1% by weight.

12. The process of claim 1 wherein said surface active bonding agent also includes in addition to the cation active agent an anion surface active bonding agent, said anion active agent being selected from the group consisting of oleophilic organic acids having at least 10 carbon atoms and their salts.

13. A process of selectively removing a small immiscible amount of organic oily impurities from water comprising treating an inert solid having a relatively large surface area with a solution of a cation surface active bonding agent whereby said bonding agent is deposited on said solid, then contacting the treated solid with said water containing said impurities, and separating the water from said solid, said agent being selected from the group consisting of primary, secondary and tertiary organic amines and quaternary ammonium, phosphonium, arsonium, stibonium and ternary sulfonium organic compounds having at least one aliphatic radical of at least 8 carbon atoms.

14. The process according to claim 13, wherein said solution is an aqueous solution.

15. A process of selectively removing a small immiscible amount of organic oily impurities from water comprising treating an inert solid having a relatively large surface area with a solution of a cation surface active bonding agent whereby said bonding agent is deposited on said solid, then contacting the treated solid with said water containing said impurities, separating the water from said solid, and regenerating said solid for further contact with water containing small amounts of oil impurities, said agent being selected from the group consisting of primary, secondary and tertiary organic amines and quaternary ammonium, phosphonium, arsonium, stibonium and ternary sulfonium organic compounds having at least one aliphatic radical of at least 8 carbon atoms.

16. A process of selectively removing small amounts of oil from water comprising passing the water containing said oil through a filter bed consisting of inert solid particles coated with a cation surface active bonding agent whereby the oil is adsorbed by said particles, and separating said oil adsorbed by said solid, said agent being selected from the group consisting of primary, secondary and tertiary organic amines and quaternary ammonium, phosphonium, arsonium, stibonium and ternary sulfonium organic compounds having at least one aliphatic radical of at least 8 carbon atoms.

17. The process of removing an oil film from the surface of a body of water, such as a harbor, having a silty bottom, comprising the steps of thoroughly admixing a cation surface-active bonding agent with a slurry of silt from said silty bottom, and spreading the treated silt slurry over said oil film, said agent being selected from the group consisting of primary, secondary and tertiary organic amines and quaternary ammonium, phosphonium, arsonium, stibonium and ternary sulfonium organic compounds having at least one aliphatic radical of at least 8 carbon atoms.

18. A process of selectively removing small amounts of lubricating oil from condensate from steam engines containing lubricating oil comprising passing said condensate through a filter bed of mineral aggregate having a relatively large surface area and having deposited thereon greater than about $\frac{1}{10}$% by weight of a cation surface active bonding agent, separating said condensate from said solid, and regenerating said solid said agent being selected from the group consisting of primary, secondary and tertiary organic amines and quaternary ammonium, phosphonium, arsonium, stibonium and ternary sulfonium organic compounds having at least one aliphatic radical of at least 8 carbon atoms.

19. A process of selectively removing small immiscible amounts of organic oily impurities from water comprising depositing a small amount of a cation surface active bonding agent on an inert solid, contacting said solid containing said bonding agent with said water containing said impurities, separating the water from said solid, separating from said solid the matter on said solid, and redepositing said bonding agent on said solid for further contact with water containing oily impurities said agent being selected from the group consisting of primary, secondary and tertiary organic amines and quaternary ammonium, phosphonium, arsonium, stibonium and ternary sulfonium organic compounds, having at least one aliphatic radical of at least 8 carbon atoms.

SYBREN TYMSTRA.
THOMAS K. MILES.